US008255968B2

(12) United States Patent
Louie et al.

(10) Patent No.: US 8,255,968 B2
(45) Date of Patent: Aug. 28, 2012

(54) SYSTEM AND METHOD FOR ADAPTIVELY CONTROLLING THE RECORDING OF PROGRAM MATERIAL USING A PROGRAM GUIDE

(75) Inventors: Alex Louie, Santa Monica, CA (US); Cesar Alvarado, Orange, CA (US); Patrick H. Hayes, Mission Viejo, CA (US)

(73) Assignee: Universal Electronics, Inc., Cypress, CA (US)

( * ) Notice: Subject to any disclaimer, the term of this patent is extended or adjusted under 35 U.S.C. 154(b) by 2617 days.

(21) Appl. No.: 10/939,821

(22) Filed: Sep. 13, 2004

(65) Prior Publication Data

US 2005/0055716 A1    Mar. 10, 2005

Related U.S. Application Data

(63) Continuation-in-part of application No. 10/287,411, filed on Nov. 4, 2002, now Pat. No. 7,254,777.

(60) Provisional application No. 60/372,874, filed on Apr. 15, 2002.

(51) Int. Cl.
*H04N 7/173* (2011.01)
(52) U.S. Cl. .............................. 725/133; 725/58; 725/39
(58) Field of Classification Search ................... 725/133, 725/39, 58
See application file for complete search history.

(56) References Cited

U.S. PATENT DOCUMENTS

| | | |
|---|---|---|
| 4,623,887 A | 11/1986 | Welles, II |
| 4,703,359 A | 10/1987 | Rumbolt et al. |
| 4,774,511 A | 9/1988 | Rumbolt et al. |
| 4,959,810 A | 9/1990 | Darbee et al. |
| 5,481,256 A | 1/1996 | Darbee et al. |
| 5,614,906 A | 3/1997 | Hayes et al. |
| 5,872,562 A | 2/1999 | McConnell et al. |
| 5,959,751 A | 9/1999 | Darbee et al. |
| 6,014,092 A | 1/2000 | Darbee et al. |
| 6,097,441 A | 8/2000 | Allport |
| 6,104,334 A | 8/2000 | Allport |
| 6,225,938 B1 | 5/2001 | Hayes et al. |
| 6,256,019 B1 | 7/2001 | Allport |
| 6,483,548 B1 | 11/2002 | Allport |
| 6,563,430 B1 | 5/2003 | Kemink et al. |
| 6,611,654 B1 | 8/2003 | Shteyn |
| 6,611,958 B1 | 8/2003 | Shintani et al. |
| 6,757,907 B1 | 6/2004 | Schumacher et al. |
| 6,771,886 B1 | 8/2004 | Mendelsohn |
| 6,792,323 B2 | 9/2004 | Krzyzanowski et al. |
| 6,970,127 B2 * | 11/2005 | Rakib ........................... 341/173 |
| 7,085,818 B2 * | 8/2006 | Brown et al. .................. 709/217 |
| 2002/0059596 A1 * | 5/2002 | Sano et al. ....................... 725/39 |

(Continued)

FOREIGN PATENT DOCUMENTS

EP    0940985 A2    9/1999

(Continued)

*Primary Examiner* — Nasser Goodarzi
*Assistant Examiner* — Jivka Rabovianski
(74) *Attorney, Agent, or Firm* — Greenberg Traurig LLP

(57) ABSTRACT

A system and method for displaying an electronic program guide ("EPG"), the EPG allowing for the controlling of recording functionality of an appliance and/or playing of media. The displayable EPG includes a listing of playable media from which the user may select a program of interest for recording or playing. The EPG may also include a display of prior recorded media for playing. Options may be presented to allow for a selection of a rendering device on which selected media is to be played.

22 Claims, 13 Drawing Sheets

U.S. PATENT DOCUMENTS

| | | |
|---|---|---|
| 2002/0181936 A1 | 12/2002 | Yuen et al. |
| 2003/0048295 A1 | 3/2003 | Lilleness et al. |
| 2003/0095156 A1 | 5/2003 | Klein et al. |
| 2003/0103088 A1 | 6/2003 | Dresti et al. |
| 2003/0149978 A1* | 8/2003 | Plotnick .................. 725/39 |
| 2003/0154478 A1 | 8/2003 | Hassell et al. |
| 2003/0177495 A1 | 9/2003 | Needham et al. |
| 2005/0028208 A1* | 2/2005 | Ellis et al. ................. 725/58 |

FOREIGN PATENT DOCUMENTS

| | | |
|---|---|---|
| WO | 98/16062 A1 | 4/1998 |
| WO | 98/17063 A1 | 4/1998 |
| WO | WO 02/085004 A1 | 10/2002 |

\* cited by examiner

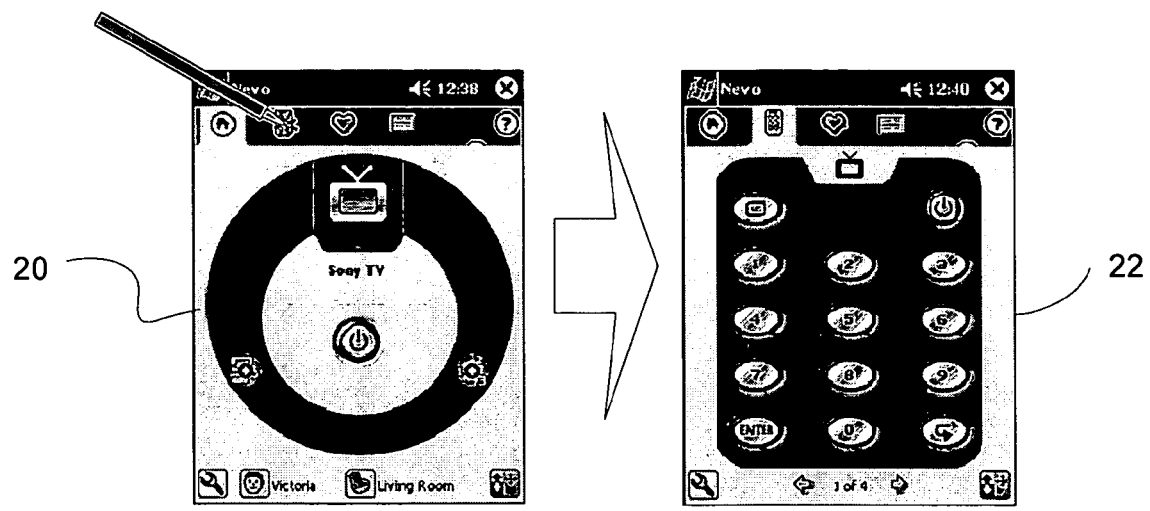
Fig 2(a)
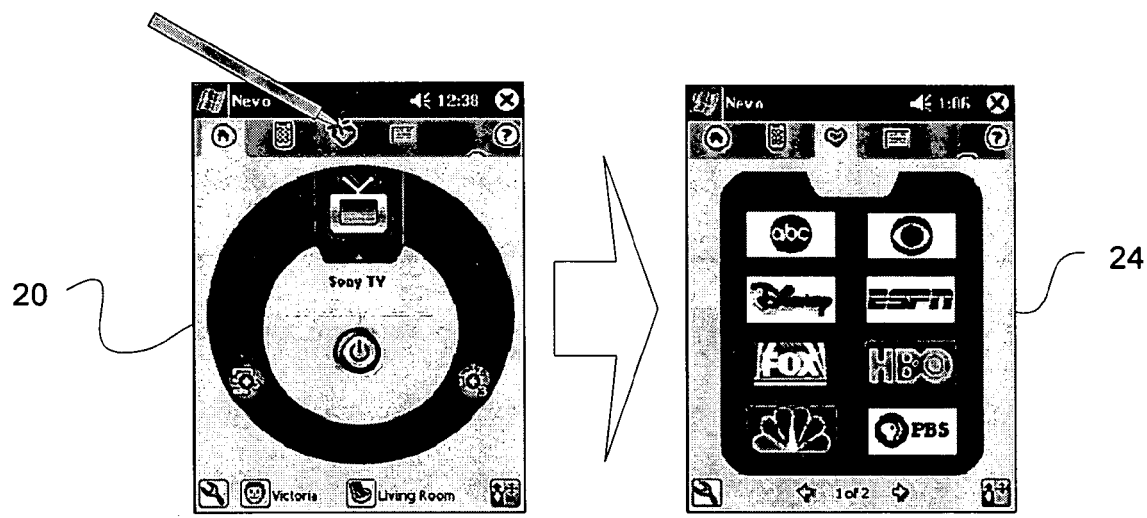
Fig 2(b)
FIGURE 2

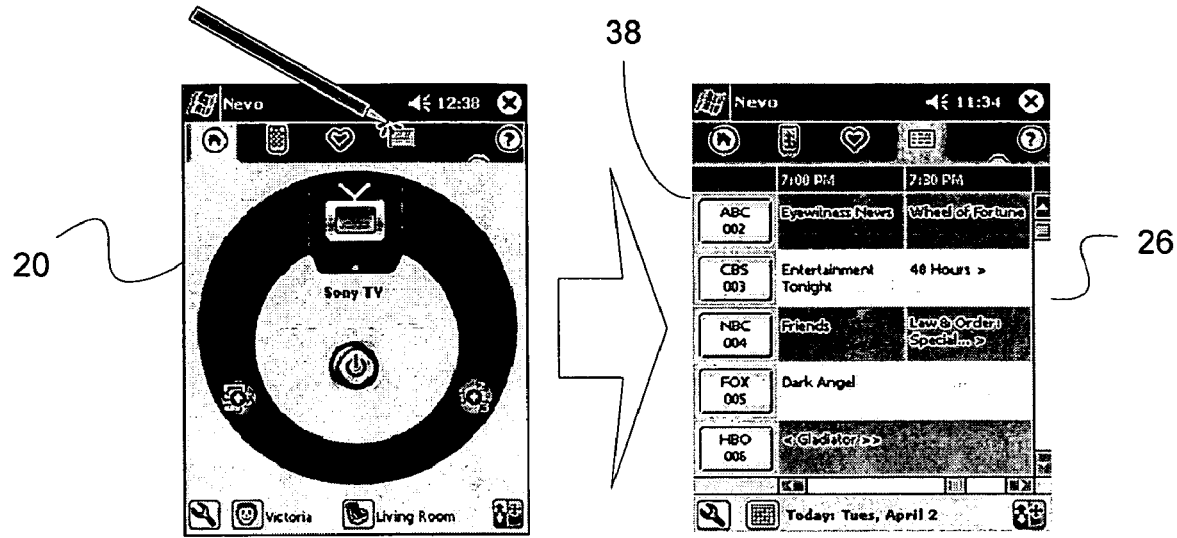
Fig 2(c)
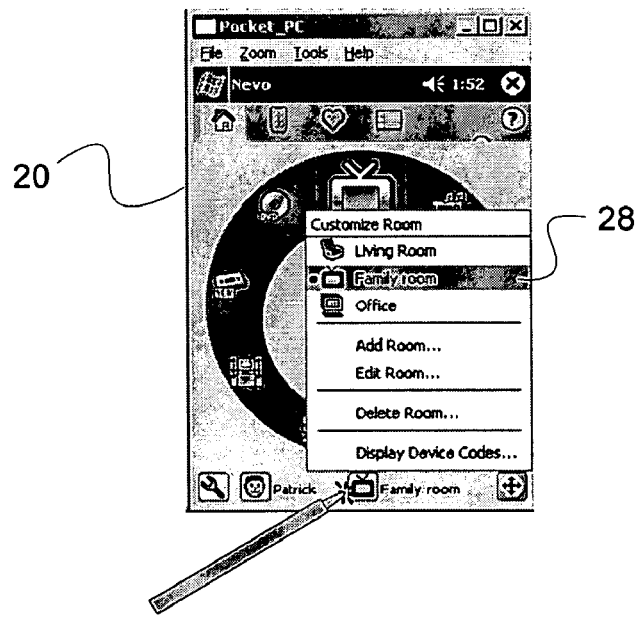
Fig 2(d)
FIGURE 2 (continued)

SYSTEM AND METHOD FOR ADAPTIVELY CONTROLLING THE RECORDING OF PROGRAM MATERIAL USING A PROGRAM GUIDE

RELATED APPLICATION INFORMATION

This application is a continuation-in-part of U.S. patent application Ser. No. 10/287,411 (U.S. 2003/0193519 A1) filed on Nov. 4 2002, which in turn claims the benefit of U.S. Provisional Patent Application No. 60/372,874, filed on Apr. 15, 2002, both of which are incorporated herein by reference in their entirety.

BACKGROUND OF THE INVENTION

This invention generally relates to electronic portable electronic devices having a display and communication capabilities, and used in conjunction with a network of entertainment recording and rendering devices. Exemplary portable devices include personal digital assistants ("PDAs"), Web Tablets, touch screen remote controls, lap-top computers, and the like. Exemplary entertainment recording and rendering devices include personal computers, digital video recorders ("DVRs," also known as "personal video recorders" or "PVRs"), conventional video cassette recorders ("VCRs"), television monitors, digital or analog audio reproduction equipment, and the like.

In the art it is known to provide a program guide feature whereby data relating to current and/or future programming (television, radio, Internet, or the like) is downloaded into a portable device and stored for later browsing by the user. It is also known to equip such portable devices with the ability to transmit remote control signals (using infrared ("IR") or radio frequency ("RF") transmissions) to change channels on a tuning device in response to selection by a consumer of a displayed guide entry. Where program guide data is presented not on the portable device but rather on the TV set of a user, the program information being supplied by a tuning device such as a cable or satellite set-top box, it is also know to provide a feature whereby user selection of a program item which is scheduled to be shown sometime in the future results in the automatic recording of that program. This type of automated recording is accomplished using capabilities that are built-in to the appliance, for example, the capabilities offered by TiVO, Replay TV, Ultimate TV, Microsoft Windows Media Center Edition software installed on a personal computer, and others or, for example, by control of the consumer's VCR via an "IR blaster."

SUMMARY OF THE INVENTION

In accordance with the description that follows, a system and method is provided for controlling the recording functionality of an appliance using an electronic program guide displayed on an electronic portable device. As will be appreciated, providing this functionality to a portable device overcomes the disadvantages seen in the prior art resulting from the fact that a consumer user is not necessarily in front of their recording appliance when browsing the program guide information. Rather, the consumer may be in another room, another building (e.g., at work), or even in another city. Furthermore, the location at which the consumer ultimately wishes to enjoy playback of the previously recorded program item may vary depending on the time of day, travel schedule, calendar date, or various other factors—once again, the consumer may be in another room, another building, or even in another city. A system and method for displaying an electronic program guide ("EPG") is disclosed, the EPG allowing for the controlling of recording functionality of an appliance and/or playing of media. The displayable EPG includes a listing of playable media from which the user may select a program of interest for recording or playback. The EPG may also include a display of prior recorded media for playback. Options may be presented to allow for a selection of a rendering device on which selected media is to be played.

To overcome the above described problem, the system and method described hereinafter will accept the consumer's recording requests, store them, and automatically convey them to an appropriately located target recording apparatus at a later time when the portable device is able to communicate with the recording appliance. The communication may take the form of docking the portable device with a computer that shares a home network with a network-enabled appliance. e.g., a PVR such as Sonicblue's ReplayTV 4000 brand system or a personal computer running Microsoft Windows Media Center Edition software (in this context it will be understood that the computer to which the portable device is docked and the computer upon which the Media Center is implemented may be one and the same); via wireless communication over a Personal Area Network or Local Area Network implemented in the consumer's home, office, or a public location (e.g. airport, coffee shop, etc.) using, for example, Bluetooth or IEEE 802.11 networking, or via direct interaction with a suitably-equipped target appliance once the portable device and the appliance are in communication range. This communication may also occur in any of the manners described above but using the Internet or PSTN as an intermediary. In this manner, the system and method described hereinafter provides a consumer with the ability to browse and select program material at any location for future recording at one of several possible storage locations and have these requests automatically entered into the appropriate recording apparatus at some later time when his portable device finds itself able to establish communications with the target recording apparatus. Furthermore, the electronic program guide may also display a listing of prior recorded and/or stored (e.g. digitally downloaded media files, files encoded from CDs or DVDs, files created by a user, etc) media and options may be presented to allow for a selection of a rendering device on which selected media, including prior recorded and/or stored media, is to be played. It will thus be understood that in the context of the below detailed description and claims, "programming" and/or "program" may be any type of recorded or stored media, including media recorded, downloaded, encoded, created, etc. by a user without limitation.

A better understanding of the objects, advantages, features, properties and relationships of the invention will be obtained from the following detailed description and accompanying drawings which set forth illustrative embodiments which are indicative of the various ways in which the principles of the invention may be employed.

BRIEF DESCRIPTION OF THE DRAWINGS

Described hereinafter are examples of systems and methods for adaptively controlling the recording of program material using a program guide, the descriptions making reference to the attached drawings in which:

FIG. 2 illustrates exemplary screen shots of a graphical user interface of the portable device of FIG. 1;

DETAILED DESCRIPTION

Figure 1:
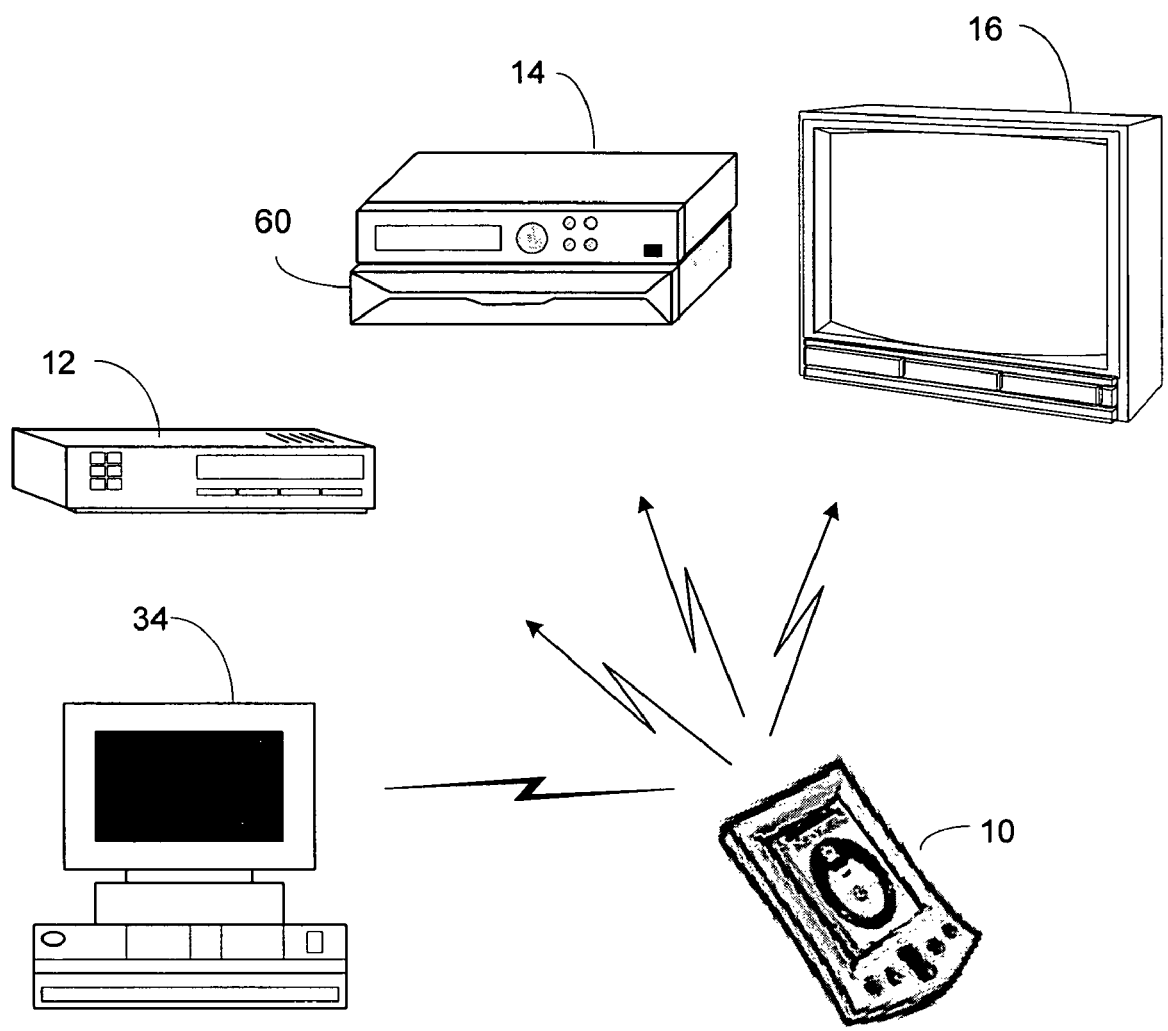
FIG. 1 illustrates an exemplary portable device having a remote control application for use in controlling the operation of home appliances.

A portable device 10 having a universal remote control and program guide application is provided. By way of example, representative platforms for the device 10 include, but are not limited to, devices such as remote controls, lap-top computers, Web Tablets and/or PDAs manufactured by HP/Compaq (such as the iPAQ brand PDA), Palm, Visor, Sony, etc. Thus, a preferred underlying platform includes a processor coupled to a memory system comprising a combination of ROM memory, non-volatile read/write memory, and RAM memory (a memory system); a key matrix in the form of physical buttons; an internal clock and timer; a transmission circuit; a power supply; a touch screen display to provide visible feedback to and accept input from a consumer; and I/O circuitry for allowing the device to exchange communications with an external computer such as server and/or client. Additional input circuitry, such as a barcode reader, may also be utilized.

To control the operation of the device 10, the memory system includes executable instructions that are intended to be executed by the processor. In this manner, the processor may be programmed to control the various electronic components within the device 10, e.g., to monitor power, to cause the transmission of signals, etc. Within the memory system, the ROM portion of memory is preferably used to store fixed programming and data that remains unchanged for the life of the product. The non-volatile read/write memory, which may be FLASH, EEPROM, battery-backed up RAM, "Smart Card," memory stick, or the like, is preferably provided to store consumer entered setup data and parameters, downloaded data, etc., as necessary. RAM memory may be used by the processor for working storage as well as to hold data items which, by virtue of being backed up or duplicated on an external computer (for example, a client device) are not required to survive loss of battery power. While the described memory system comprises all three classes of memory, it will be appreciated that, in general, the memory system can be comprised of any type of computer-readable media, such as ROM, RAM, SRAM, FLASH, EEPROM, or the like in combination. Preferably, however, at least part of the memory system should be non-volatile or battery backed such that basic setup parameters and operating features will survive loss of battery power. In addition, such memories may take the form of a chip, a hard disk, a magnetic disk, and/or an optical disk without limitation.

For commanding the operation of appliances of different makes, models, and types, the memory system may also include a command code library. The command code library is comprised of a plurality of command codes that may be transmitted from the device 10 under the direction of the remote control application for the purpose of controlling the operation of an appliance. The memory system may also include instructions which the processor uses in connection with the transmission circuit to cause the command codes to be transmitted in a format recognized by an identified appliance. While the transmission circuit preferably utilizes infrared transmissions, it will be appreciated that other forms of wired or wireless transmissions, such as radio frequency, may also be used. Where radio frequency transmission is used, this may take the form of direct RF communication with the appliance(s) to be controlled, or may comprise issuing an RF command to an infrared signaling device co-located with the equipment to be controlled, as described for example in co-pending U.S. Provisional Patent application 60/517,283 entitled "Home Appliance Control System and Methods in a Networked Environment" which is incorporated herein by reference in its entirety.

To identify appliances by type and make (and sometimes model) such that the remote control application of the device 10 is adapted to cause the transmission of command codes in the format appropriate for such identified appliances, information may be entered into the device 10. Since methods for setting up a remote control application to cause the transmissions of commands to control the operation of specific appliances are well-known, they will not be described in greater detail herein. Nevertheless, for additional details pertaining to remote control application setup, the reader may turn to U.S. application Ser. No. 10/288,727 (U.S. 2003/0103088 A1) entitled "User Interface for a Remote Control Device" as well as U.S. Pat. Nos. 6,225,938, 4,623,887, 5,872,562, 5,614,906, 4,959,810, 4,774,511, and 4,703,359 all of which are incorporated herein by reference in their entirety. It should also be appreciated that these set-up methods may be used to configure a personal computer to communicate with a home appliance, for example, if the personal computer is anticipated to use communications to command the operation of appliances in a home entertainment network such as described below.

To cause the device 10 to perform an action, the device 10 is adapted to be responsive to events, such as a sensed consumer interaction with one or more keys on the key matrix, a sensed consumer interaction with the touch screen display, or a sensed signal from an external source such as a remote computer. In response to an event, appropriate instructions within the memory system are executed. For example, when a hard or soft command key associated with the remote control application is activated on the device 10, the device 10 may read the command code corresponding to the activated command key from the memory system and transmit the command code to an appliance in a format recognizable by the appliance. It will be appreciated that the instructions within the memory system can be used not only to cause the transmission of command codes to appliances but also to perform local operations. While not limiting, local operations that may be performed by the device that are related to the remote control application include favorite channel setup, macro button setup, command function key relocation, etc. Examples of such local operations can be found in U.S. Pat. Nos. 5,481,256, 5,959,751, 6,014,092, which are incorporated herein by reference in their entirety.

As discussed, the platform of the device 10 preferably comprises a general purpose, processor system which is controllable by software. The software may include routines, programs, objects, components, and/or data structures that perform particular tasks that can be viewed as an operating system together with one or more applications. The operating system, such as the "Windows CE" brand operating system or the like, provides an underlying set of management and control functions which are utilized by applications to offer the consumer functions such as calendar, address book, spreadsheet, notepad, Internet browsing, etc., as well as control of appliances. Thus, it is to be understood that applications in addition to or complimentary with the remote control application can also be supported by the device 10 and, as such, in terms of the internal software architecture, the "remote control" application may be but one of several possible applications which may co-exist within the device 10.

In terms of providing operating system functionality, it should also be understood that the demarcation between the portable device 10 and a host/client computer, described in greater detail hereinafter, may vary considerably from product to product. For example, at one extreme the portable device 10 may be nothing more than a slave display and input device in wireless communication with a computer that performs all computational functions. At the other extreme, the portable device 10 may be a fully-functional computer system in its own right complete with local mass storage. It is also to be appreciated that a hardware platform similar to that described above may be used in conjunction with a scaled-down operating system to provide remote control functionality only, i.e., as a standalone application. In all cases, however, the principles expressed herein remain the same.

To provide a means by which an consumer can interact with the device 10, the device 10 is preferably provided with software that implements a graphical user interface. The graphical user interface software may also provide access to additional software, such as a browser application, that is used to display information that may be received from an external computer. Such a graphical user interface system is described in previously referenced pending U.S. application Ser. No. 10/288,727 as well as in pending U.S. application Ser. No. 10/290,605 (U.S. 2003/0095156 A1) entitled "Hand Held Remote Control Having an Improved User Interface" and U.S. Provisional Application 60/264,767 entitled "Universal Remote Control with Display" which are incorporated herein by reference in their entirety.

For controlling the operation of one or more consumer appliances, such as, for example, an audio receiver 12, a VCR 14, a television 16, and/or a PVR 60 as illustrated in FIG. 1, the portable device 10 includes a remote control application. Features offered by the remote control application may include a "home page" 20 from which the user may select various functionalities such as, for example, a device control panel 22, a "Favorites" page 24 (which allows direct tuning to favorite program channels by logo/name), a program guide display 26, etc. as illustrated in FIG. 2. The universal remote control application may also include the capability to configure multiple rooms, each with distinct equipment, and allow a user to select his current location from a list 28 as illustrated in FIG. 2d. For a more detailed description of this feature, the interested reader may refer to the previously referenced U.S. application Ser. No. 10/288,727. The user's current location may alternatively be automatically determined using, for example, the methods described in U.S. Provisional Patent Application 60/517,588 entitled "System and Method for Controlling Device Location Determination" or in U.S. Pat. No. 6,563,430 entitled "Remote Control Device with Location Dependent Interface."

Figure 3:
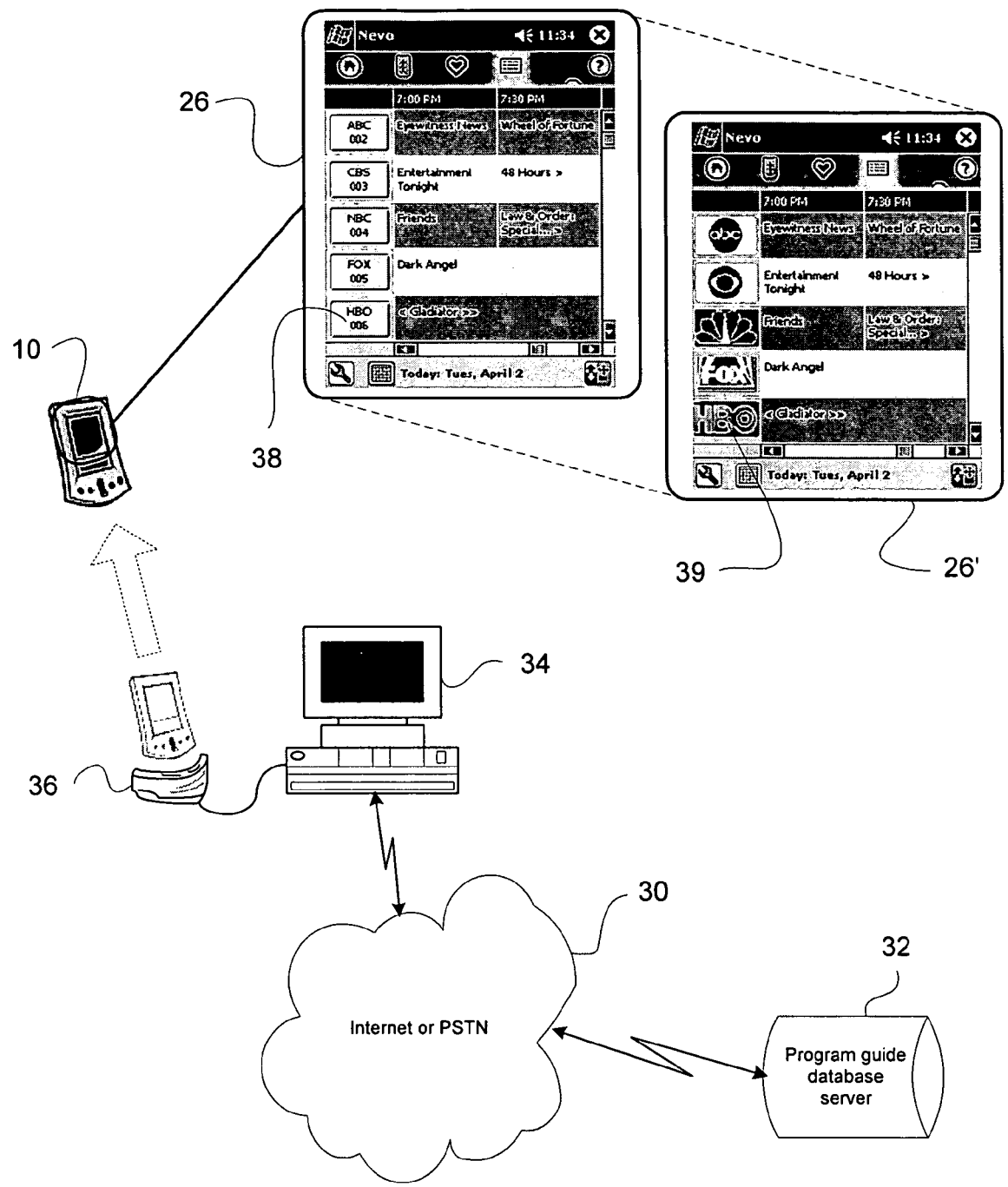
FIG. 3 illustrates an exemplary network by which program guide information is downloadable to the portable device of FIG. 1.

While not intended to be limiting, the program guide display 26 may be arranged in a grid having a plurality of cells in which programming information is contained, the grid consisting of cells arranged in rows corresponding to content providers and columns corresponding to times of day. For convenience of a user, the program guide display 26 row indicators may also be formatted using channel names and/or numbers 38, as illustrated in FIGS. 2c or 3, or channel logos 39, as illustrated in FIG. 3. Still further, the row indicators may themselves comprise soft keys or hard keys (collectively referred to as "buttons") which the consumer may activate in order to have the device 10 transmit the appropriate remote control command(s) to cause an appliance to tune to a channel corresponding to the labeled button. If used, the channel logo graphics may be included as part of downloaded program guide data, as will be described hereinafter, or the graphics may be linked to and derived from the favorite channel display page(s) 24. It will also be appreciated that the program guide display 26 may be arranged in numerical or alphabetical sequence by channel, by favorite channel (in the same sequence as they appear in a favorite channels page 24), by program type or genre, etc.—either automatically or manually by a user.

Data for the program guide display 26 may be obtained over the Internet 30 from a program guide database server 32 using a personal computer 34 and docking station 36 as illustrated in FIG. 3. In such a system, the device 10 is periodically docked with the docking station 36 for file synchronization purposes. Since software for providing such synchronization functionality, e.g., Microsoft's ActiveSync brand synchronization software, is well known and widely used in PDA applications, this functionality will not be discussed in further detail herein. It will also be appreciated that while described and illustrated in this instance in terms of a physical docking station 36, such synchronization may be equally well performed wirelessly via IEEE 802.11 "WiFi", Bluetooth, etc., when the device 10 and PC 34 are equipped with suitable RF networking capabilities. Accordingly, throughout this document use of the term "docking" in the context of data transfer or file synchronization, should be understood to encompass any available form of connectivity between the PDA 10 and a personal computer 34.

Figure 4:
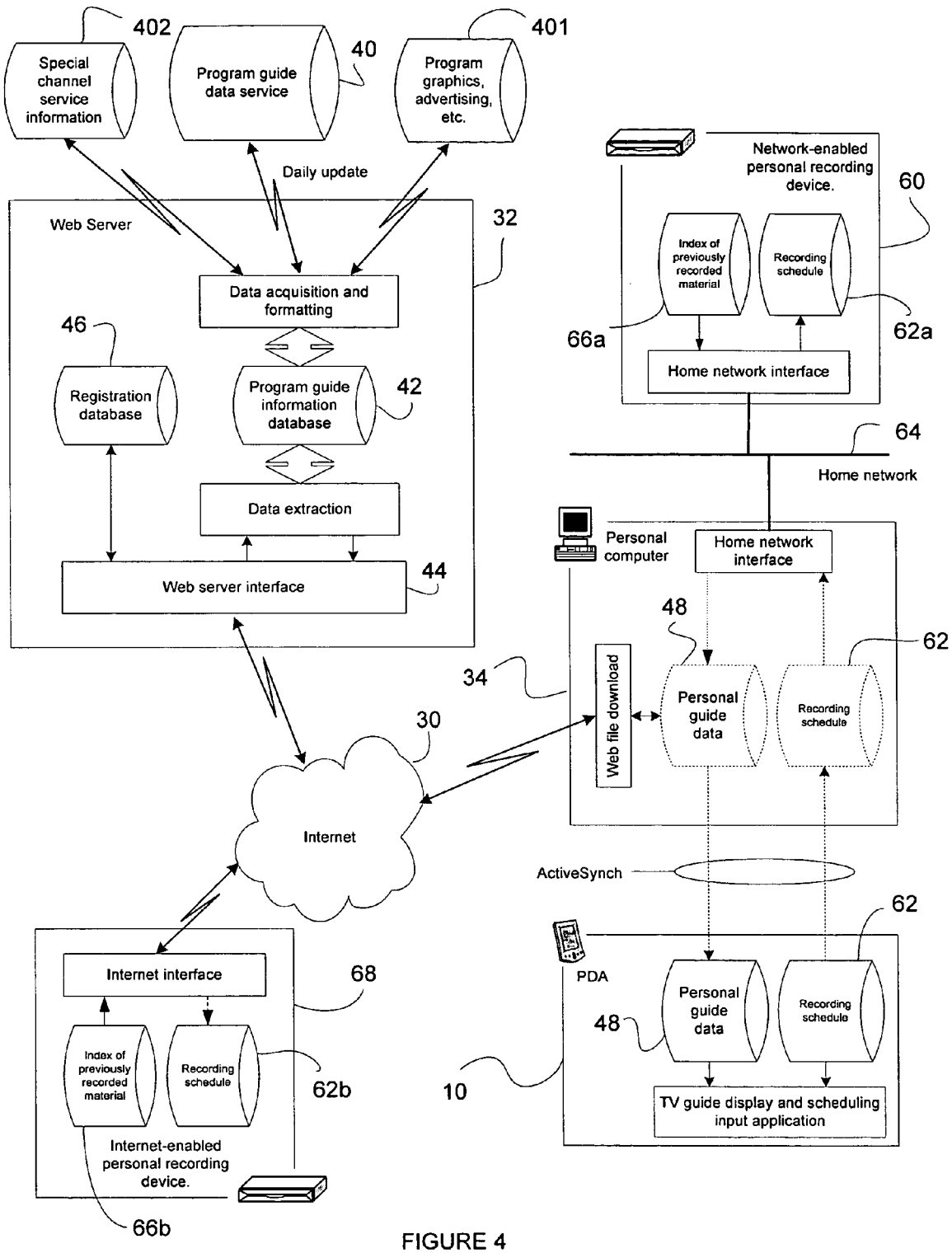
FIG. 4 illustrates a more detailed view of the network illustrated in FIG. 3 together with the user's home network.

To acquire guide data for use in connection with the remote control application, an exemplary guide data acquisition process is illustrated in FIG. 4. As illustrated, raw program guide data 40 is generally available by subscription from entities such as, for example, Tribune Media Services ("TMS"). A program guide data server 32 is normally configured to access the TMS data on a periodic basis, typically once every 24 hours, after TMS's nightly update is complete. The raw guide data obtained from TMS may then be formatted and stored into a local database 42 associated with the Web server 32. Additional data, such as graphics 401, which may be associated with program descriptions, special service information, and/or advertising 402 (e.g., pay-per view), etc. may also be obtained from third-party sources and combined into the database 42 for later delivery to system users. It should also be appreciated that, while the illustrated examples are in the context of a TV program database sourced from TMS, in practice the programming information stored in the server database 42 may be obtained from several different sources and may span more than one type of programming, for example, radio broadcast information, Webcasts, movies available for download, etc. in addition to or as a substitute for TV schedule information.

Figure 12:
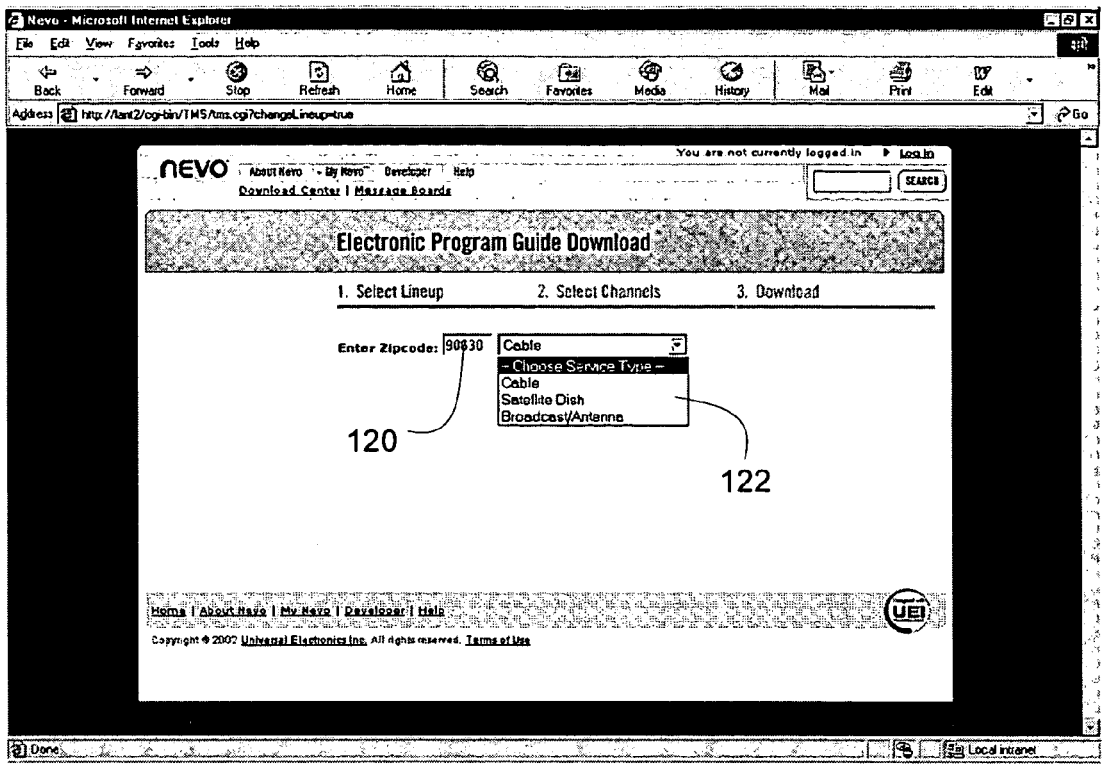
FIGS. 12-14 illustrate exemplary registration screens by which the consumer can specify preferences for a downloaded program guide.
Figure 13:
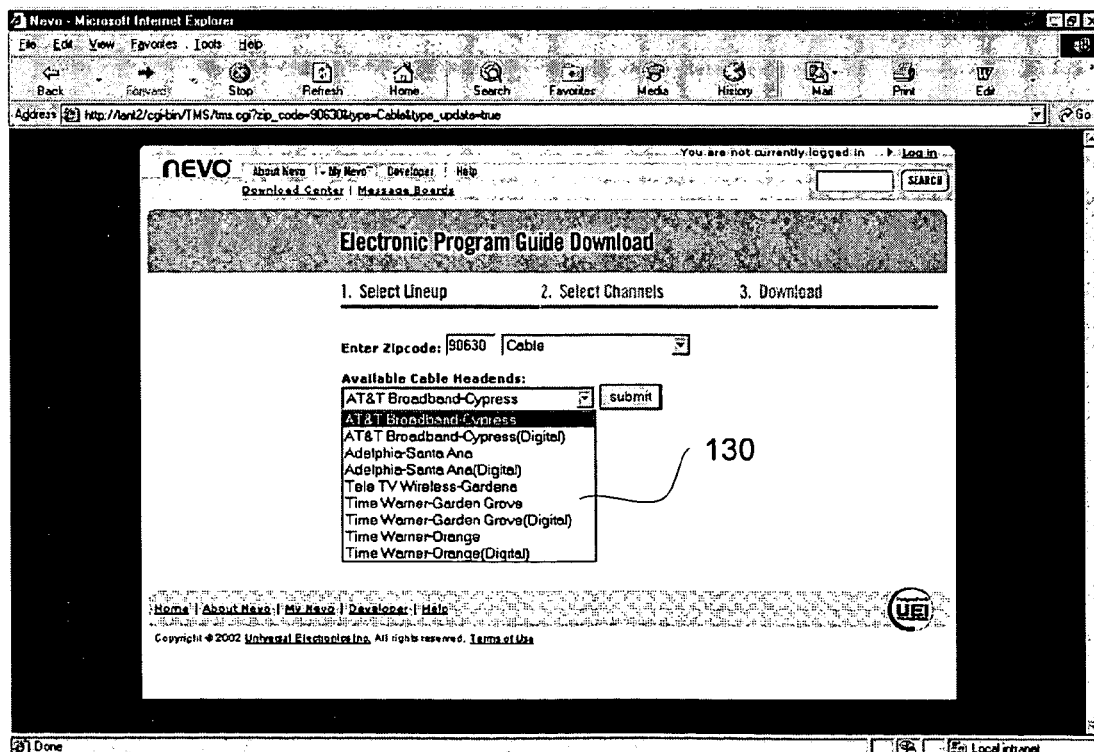
Figure 14:
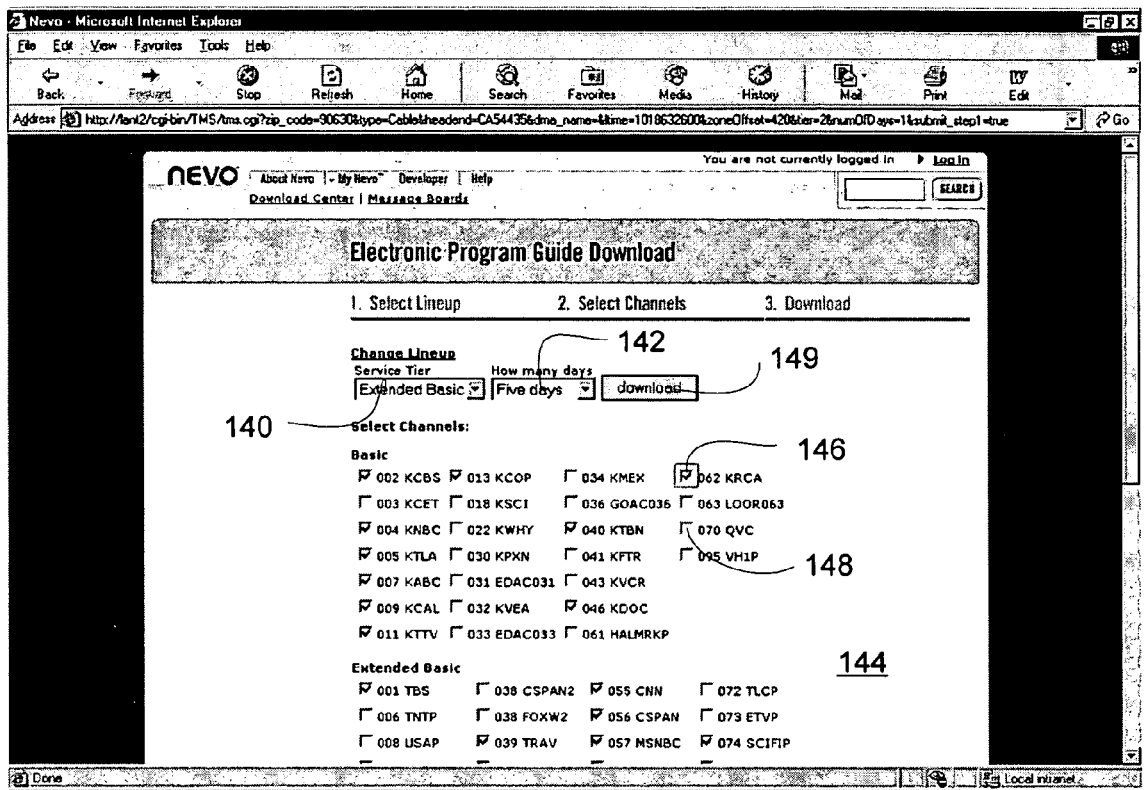

To obtain program guide information, a consumer may log onto the Web server 32 using a personal computer 34 and any standard Web browser such as, for example, Microsoft's Internet Explorer brand Web browser. The Web server 32 identifies the consumer and their preferences via a combination of log-in data stored in a registration database 46 and/or a "cookie" stored on the consumer's local hard drive. Referring to FIGS. 12-14, the first time the consumer accesses the Web server 32 they may be asked to submit information which includes a zip code 120, type of service 122 (e.g., cable, satellite, etc.), service provider 130 (e.g., DirectTV, Cox Cable, etc.) and level of service 140 (e.g., basic, extended basic, premium, etc.). Based on this data, the consumer could be presented with a complete channel line-up 144 for their particular service tier and allowed to select which channels they desire to be included in their guide display. Examples of selected and unselected channels are shown at 146 and 148, respectively, in FIG. 14.

In addition, the consumer may be requested to indicate how many days of programming information 142 the consumer wishes to download in each session. As these latter parameters are changed, an indication of the estimated size of the file to be downloaded may be displayed for the convenience of the consumer. This is particularly advantageous for consumers that have slower, dial-up communication lines with the Web server 32 in that they may trade off the extent of the program guide content to download against download time.

The parameters established during this initial interaction with the Web server 32 may then be stored in the registration database 46 and/or locally in a cookie and redisplayed whenever the consumer subsequently accesses the site. Thus, during subsequent visits to the Web server 32, the consumer may accept all the parameter values "as is" or make changes as desired. Certain of these parameters may also be accumulated by the Web server 32 for statistical purposes (e.g., "How many cable subscribers in Irvine Calif. include MTV in their program guide data?"). While described in terms of a consumer manually accessing the Web server 32 using a Web browser to retrieve the guide data, once the initial preference parameters are obtained the process of downloading program guide data may be automated. For example, the consumer's computer 34 can be configured to automatically dial out via a PSTN or and/or connect via the Internet at a fixed time every night, at some predetermined time interval, etc. to contact the Web server 32 and retrieve the guide data.

Figure 7:
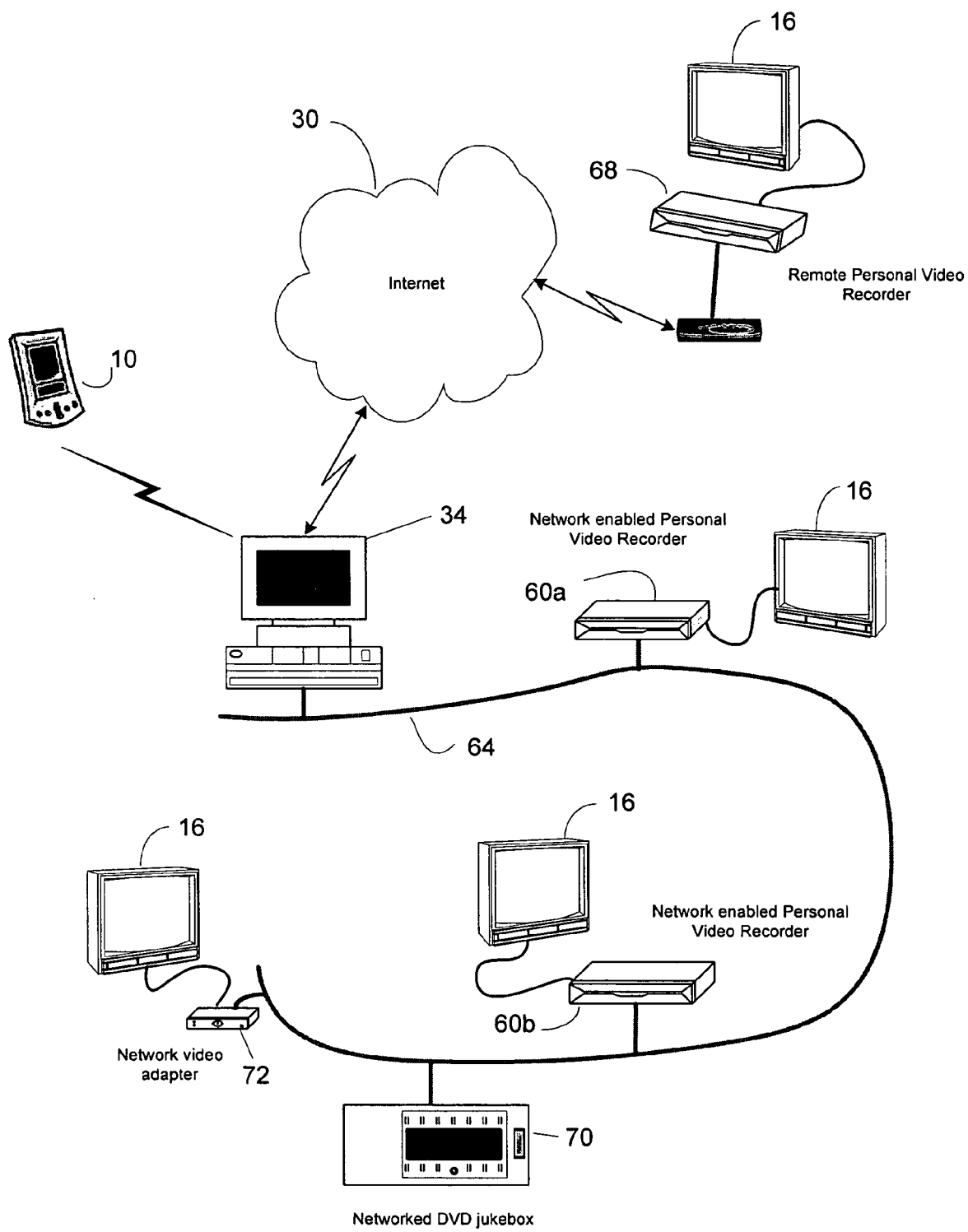
FIGS. 7-11 illustrate exemplary networks by which the portable device of FIG. 1 can be used to automatically enable the recording function of a home appliance.

Based on the identity and preferences of a consumer, a Web server interface 44 and related data extraction programs, illustrated in FIG. 4, extract an appropriate subset of the program guide data stored in the database 42 and format this extracted data into a personal guide data file 48 for transfer to the consumer's computer 34 via the Internet 30. The transferred guide data file may include program listing information originating from the program guide data provider 40; supplemental graphics and/or advertising either associated with particular programs or free standing (originating from program graphics provider(s) 401); special channel service information 402 (originating from the service provider of other entities); etc. all of which may be individually tailored to the consumer based on their specified preferences, service type, and/or geographic location. Once located on the consumer's computer 34, the file 48 may be supplemented with data 66a, 66b representative of material available from non-broadcast sources such as local or remote personal recording devices 60 and 68, locally resident on PC 34 itself, or available on networked media source devices such a DVD jukebox 70 (as shown in FIG. 7), etc. All of this personalized guide data contained in file 48 may be automatically transferred to the device 10 via the synchronization process the next time the device 10 is docked with the computer 34.

The channel guide data downloaded to the portable device 10 may include panels (individual entries), rows (horizontally across the time axis), and/or columns (vertically along the channel axis) and may include advertising or other information interspersed within or overlaying the panels. As noted, advertising or other information data may be inserted by the data extraction program of the Web server 32 based on the preferences of a consumer, the specified service type, the geographic location of the user, and/or data that the service provider desires the consumer to be exposed to.

Figure 5:
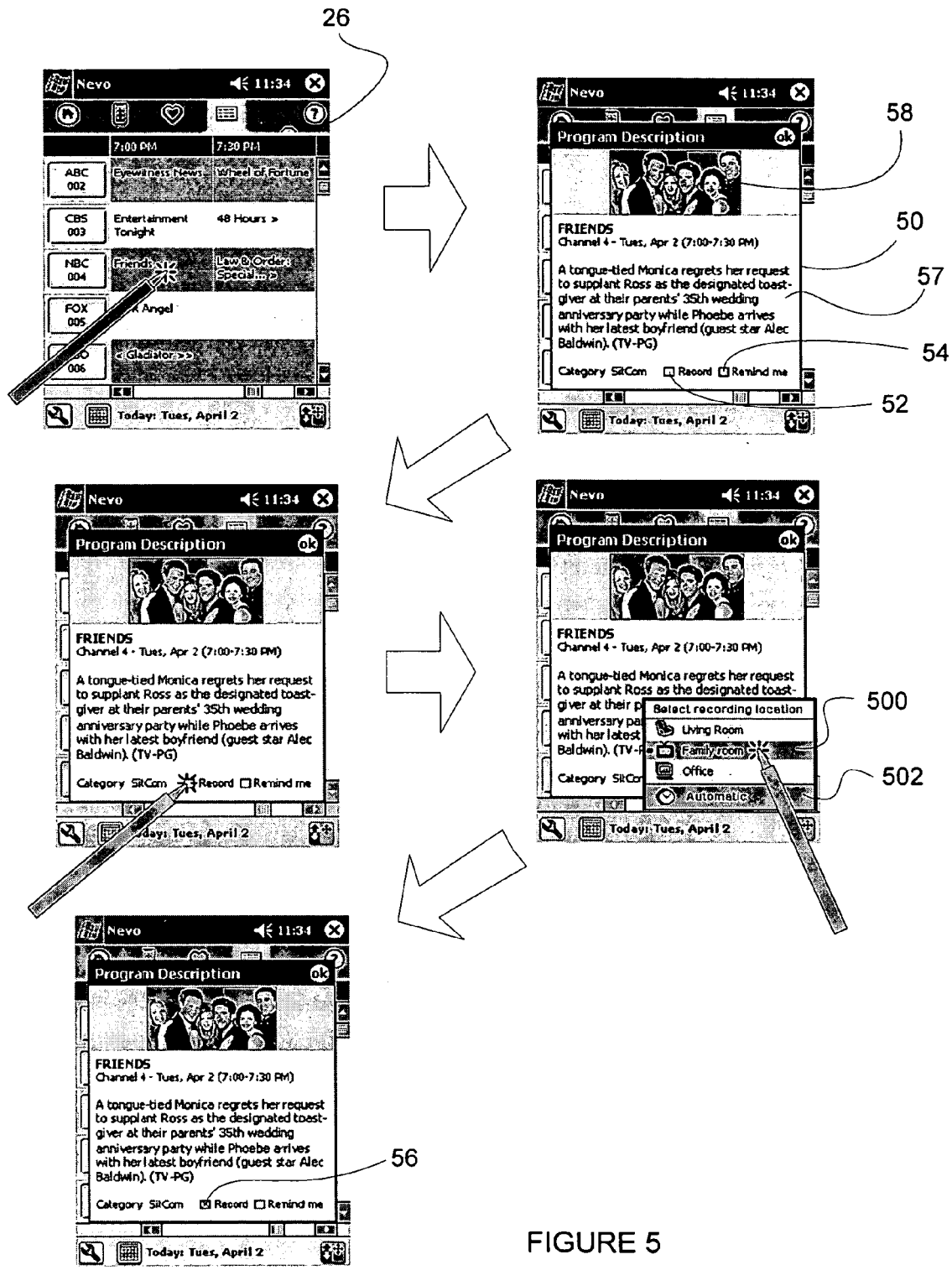
FIG. 5 illustrates exemplary screen shots of a graphical user interface of the portable device of FIG. 1 specifically illustrating interaction with the downloaded program guide information to effect automatic program recording.

Turning now to FIG. 5, the program guide display 26 may be configured such that, if the consumer touches a particular guide listing, e.g., "Friends," a pop-up window 50 displays additional information regarding the program. The pop-up window 50 may include extended information 57 regarding the program and, in some embodiments, may include supplemental graphics 58 which originated from sources (401, 402) other than the provider of the raw guide data 40. The pop-up window 50 may also include check boxes, or other graphical user interface elements, such as menus or the like, to accept user input. In the illustrated example, a check box 52 and a check box 54, which can be selected using conventional GUI techniques, allow the consumer to either tag the program event for future recording or to create a reminder entry in a calendar application resident on the device 10 and/or computer 34.

By way of example, touching the "Record" check box 52 causes the data regarding this program event (time, channel, duration, etc.) to be entered into a recording schedule data file 62 (shown in FIG. 4) located within the device 10. In certain embodiments, multiple recording appliances may be supported. To this end, if the recording scheduling application is aware of multiple recording appliances at different locations each capable of serving as a repository for the requested program, for example PVRs 60,68 and/or PC 34 of FIG. 4, device 10 may at this point present the user with a list of possibilities, for example the pop-up 500 illustrated in FIG. 5. This list may be presented as a roster of specific equipments, or may be arranged for greater user convenience by room or geographic location as illustrated in FIG. 5. The illustrated pop-up menu 500 allows the user to specify the preferred location or appliance at which he intends to later view the recorded material, for example "Family Room," although, as will be described later this choice may be revised at playback time. The choices presented may also include an "automatic" option 502 which may for example default to the user's current location, or alternatively may be synchronized to a calendar application as described in more detail hereafter. Once a location has been selected (or if only one exists), to confirm the acceptance of the recording request in the data file 62, the appearance of the check box 52 may be caused to change 56. The device 10 may also perform conflict resolution (e.g., to determine if there are any overlapping requests) interactively at this level, or may simply store all requests for later resolution by the recording device. If multiple recording appliances are available and a conflict is discovered, the device 10 and/or software in the PC 34 may redirect the recording request to an alternate recording appliance. It will also be appreciated that the data regarding the program event may be stored as described above (date, time, channel, recording location) using one or more compressed forms, as pointers into guide database entries in the event the target recording appliance and the portable device 10 use a common data source for guide information, etc. It is also desired to allow the consumer to remove recording request data from the file for example, by returning to a program listing and un-checking the box 52.

As is known in the art, portable device 10 may include other capabilities besides the universal remote control and program guide. In particular, a calendar or scheduling application may be supported, such as for example is provided as part of Microsoft's Pocket PC software suite. It will also be understood that the calendar or scheduling application, and/or data from such calendar or scheduling application(s) need only be available to a recording scheduling application as described herein, and need not be resident in the memory of portable device 10 in order to accomplish the inventive system and method. The basic functioning of such calendar applications is well know and will not be discussed in further detail herein, however for additional insight into the uses of such calendar applications in conjunction with TV guides, etc., the reader is referred to co-pending U.S. application Ser. No. 10/287,337 (U.S. 2003/0048295 A1) entitled "System and Method for Updating Information in a Portable Electronic Device" which is hereby incorporated by reference in its entirety.

Figure 15:
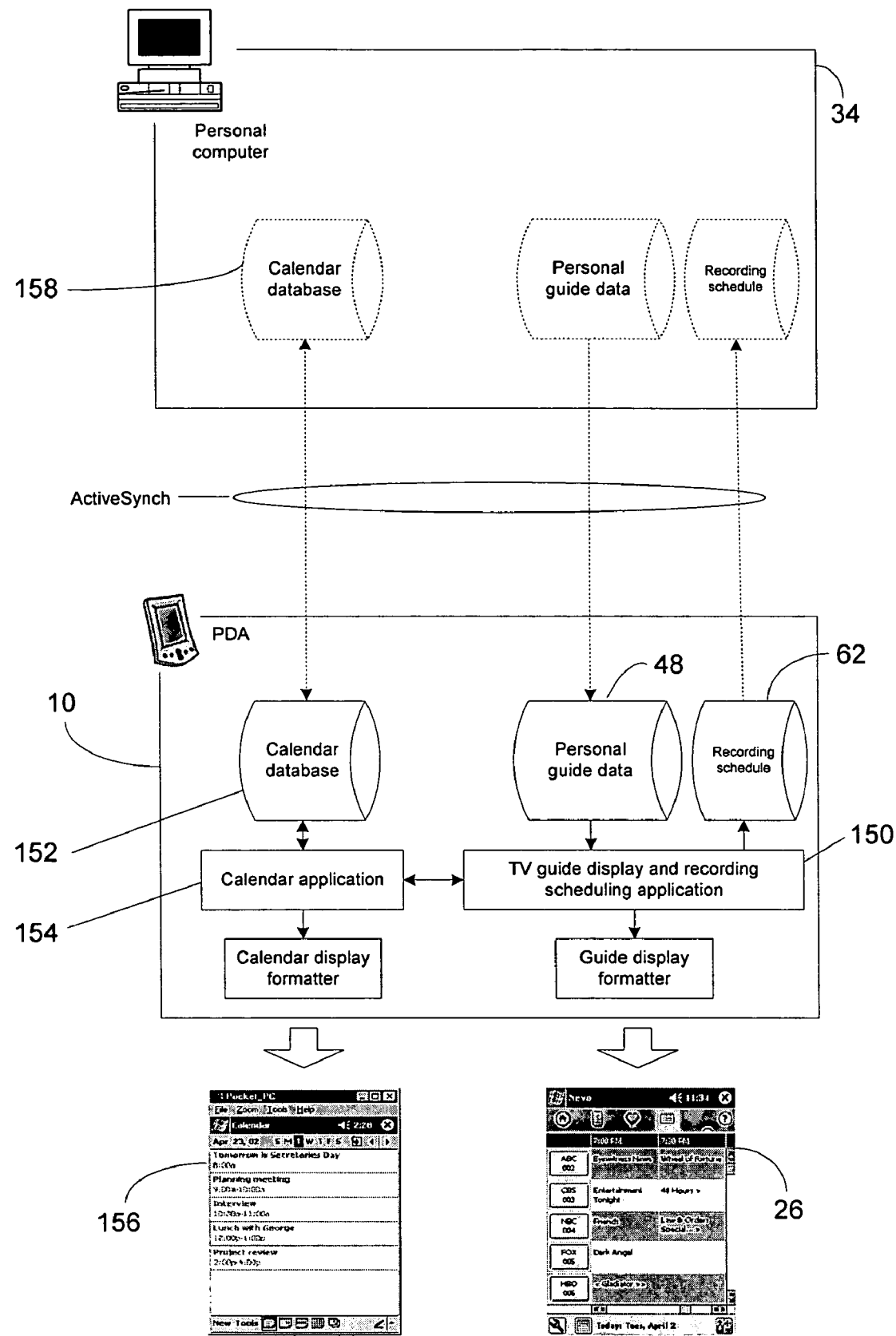
FIG. 15 illustrates the exemplary provision of a calendar database in the portable device of FIG. 1.

Turning now to FIG. 15, a TV guide display and recording scheduling application 150 provided as part of the universal remote control feature previously described may cooperate with such a calendar application 154 in order to ascertain a user's planned future locations as one method of implementing an automatic option 502 for the recording location choice. Furthermore, exemplary calendar application 154 may periodically synchronize it's data 152 with calendar data 158 resident in PC 34, for example that of Microsoft's Outlook application. In the event changes are detected in a user's schedule, calendar application 154 may convey these to recording scheduling application 150 which can then make any necessary adjustments to the target recording appliances in recording schedule data 62. It should be appreciated that this coordination and adjustment process, while described in terms of actions within portable device 10 may alternatively be performed within PC 34 with equal efficiency. It will also be understood and appreciated that the passing and exchange of data between the recording scheduling application and calendar application (or other traditional computing applications) in order to facilitate the inventive system and method described herein may be accomplished via a variety of known programming methods (for example XML based data exchange methods, or the data exchange capabilities provided by Microsoft's COM, DCOM, or .NET technologies) which are well within the ordinary abilities of one skilled in the art.

Returning now to FIG. 4, the consumer's computer 34 may also be connected to a home network 64 which may be wired or wireless. In such a case, also attached to the home network may be one or more network-enabled appliances, for example, a ReplayTV brand personal video recorder ("PVR"), a network capable DVD jukebox, a media server application resident on PC 34, etc. When the portable device 10 is docked with the computer 34 for file synchronization, not only is any updated guide data 48 transferred from the computer to the device 10, but the contents of the recording schedule request file 62 could be transferred from the device 10 to the computer 34. The appropriate portions 62a, 62b of recording request data 62 can then be transferred from the computer 34 to PVRs 60, 68 via the home network 64 or Internet 30. In this manner, a consumer may browse a device-based program guide and enter recording requests wherever the consumer happens to be located and these requests will be logged and automatically transferred to the recording appliance at a later time.

To facilitate user's access to previously recorded and stored material, TV guide data 48 may be supplemented by listings of material available from non-broadcast sources such as local or remote personal recording devices 60 and 68, locally resident on PC 34 itself, or available on networked media source devices such a DVD jukebox 70, as described earlier. The data may be collected from the various devices by polling the devices, either directly or via a network gateway, to determine what programs are stored on the devices. To this end, the polling may be user initiated and/or automatically performed, for example, automatically in response to a request to display an EPG. The data returned may be limited to programs of a certain type, for example, data indicative of recorded/stored audio visual programs or data indicative of audio programs alone may be returned. Such polling may utilize file type extensions, e.g., ".mpg," ".jpg," ".wav," etc., in the process of gathering information pertaining to recorded/stored programs. The polling may also utilize information stored within headers of the stored/recorded programs as a means to filter which information is returned. The type of data to be returned may be user settable or may be automated, for example, being dependent upon the type, genre, etc. of the information to be displayed within the EPG.

Figure 6:
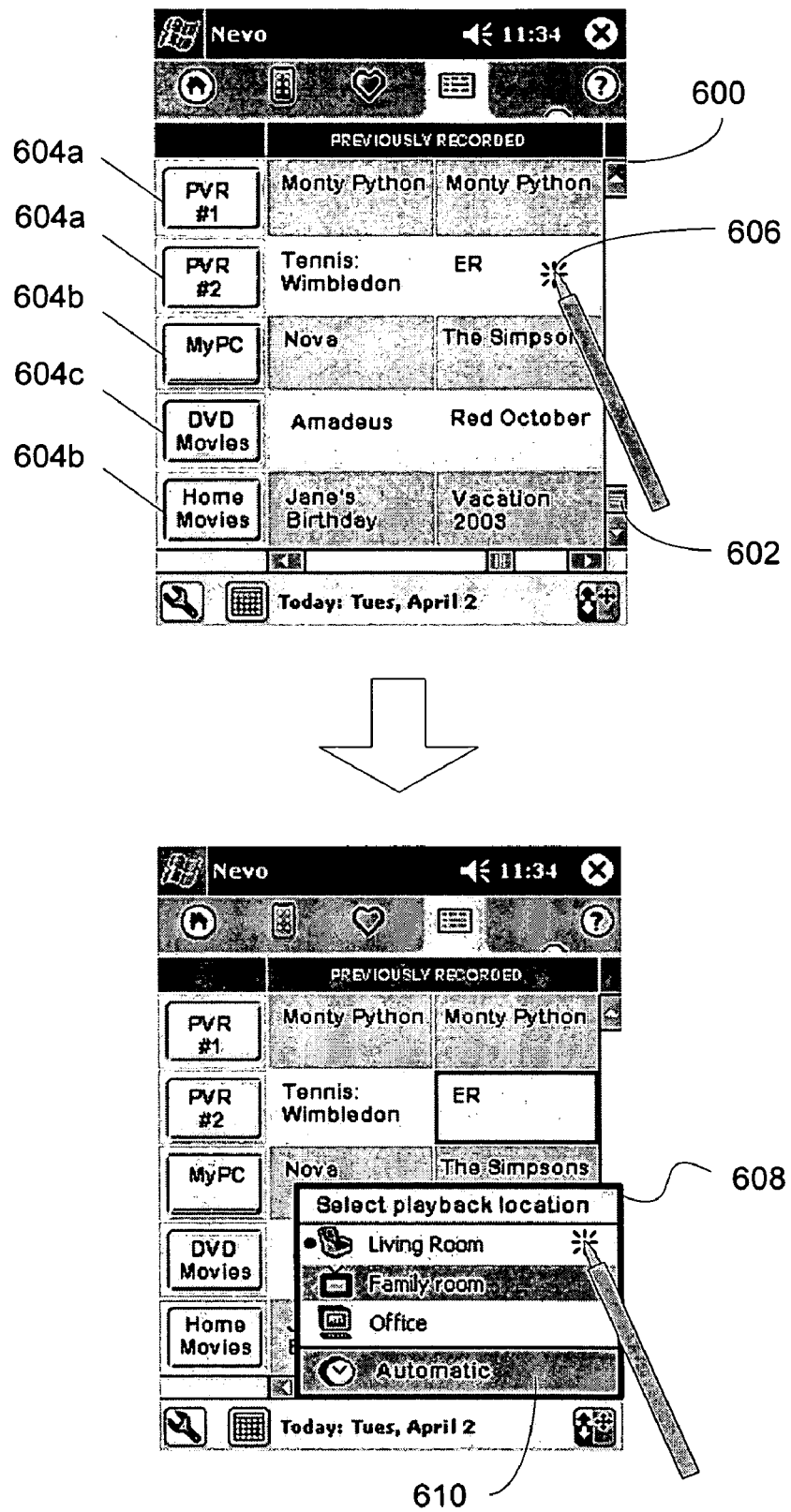
FIG. 6 illustrates exemplary screen shots of a graphical user interface of the portable device of FIG. 1 specifically illustrating incorporation and use of listings for previously recorded material into the program guide information display.

FIG. 6 illustrates how such data may be presented to a user as an extension 600 of the TV guide data display or separate. In the example illustrated, these entries are appended en bloc to the end of the guide data, accessible by moving slider 602 all the way to the bottom as shown. Other arrangements are also possible, e.g. presenting items both broadcast and prerecorded sorted by genre, user favorites, etc. The illustrated display includes listings 604a of content available on PVR appliances as well as listings 604b for content available from media server applications on PC 34 and a listing 604c for content available on a networked DVD jukebox. Selection of content for playback may be performed by tapping on the desired item, e.g., as illustrated at 606. Once the item is selected, a pop-up menu 608 may be presented from which the user may select the desired location or rendering appliance for playback. Once again, one choice 610 may comprise an automatic mode whereby the default may be the location specified at the time the recording was scheduled (in the case of PVR-based content), may be the user's current location (as determined by device 10), may be the closest location at which an appliance capable of rendering the selected material is available (e.g. an HDTV monitor), may depend on time of day and/or day of week, etc. The selection amongst those possibilities may be user-configurable or may itself be automatically determined via a prioritization algorithm, e.g. first choice is user's current location provided a suitable rendering appliance is available, second choice is location of original recording, etc.

Figure 8:
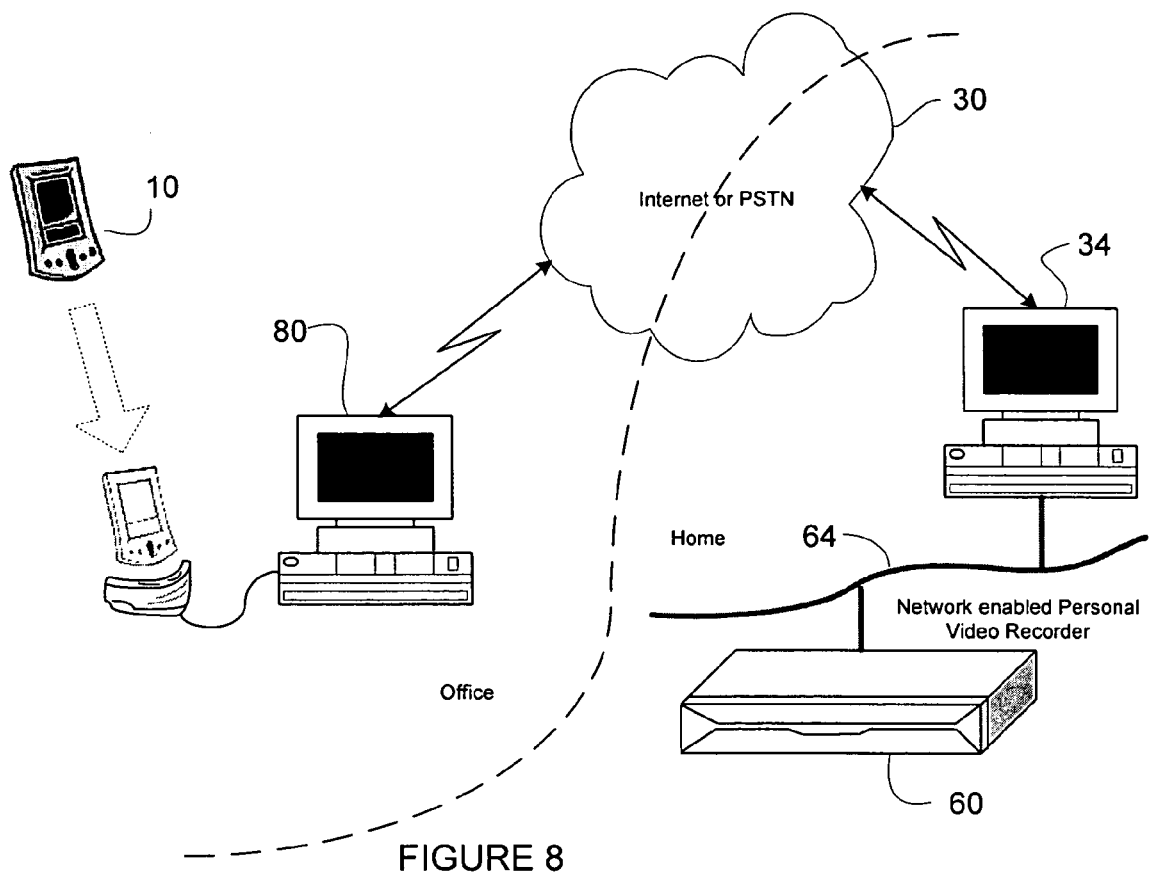
Figure 9:
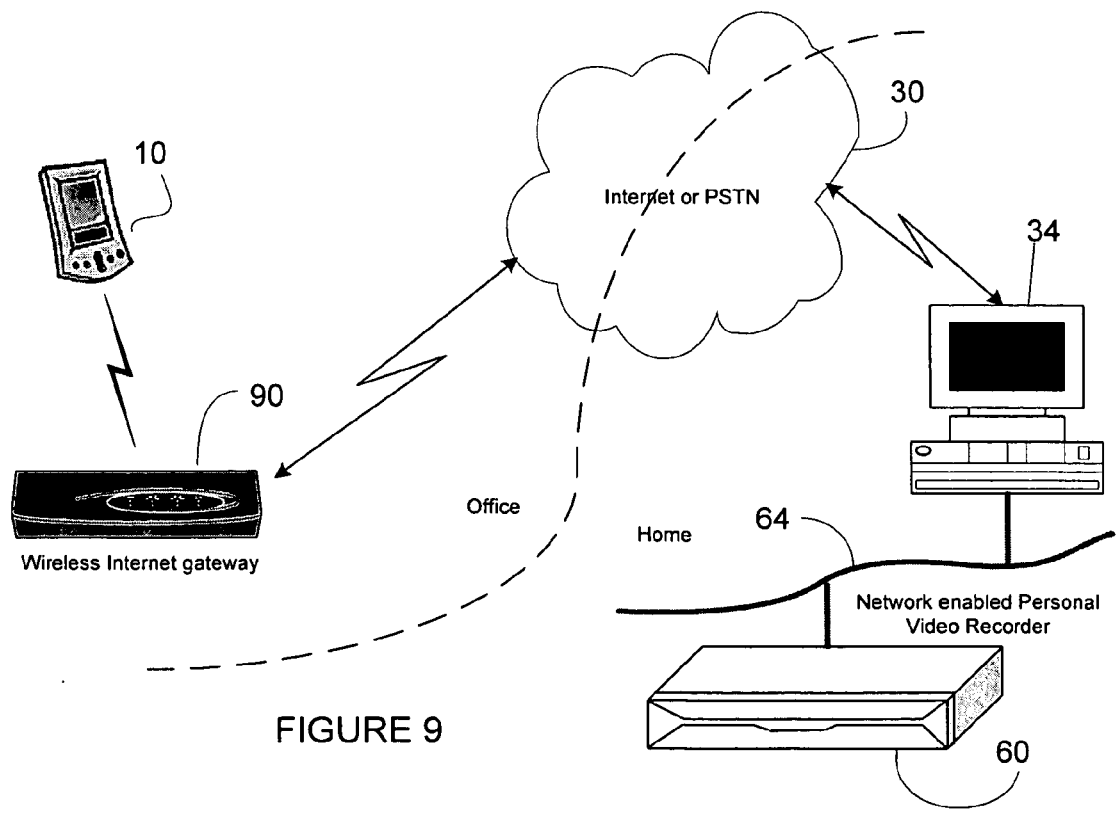
Figure 10:
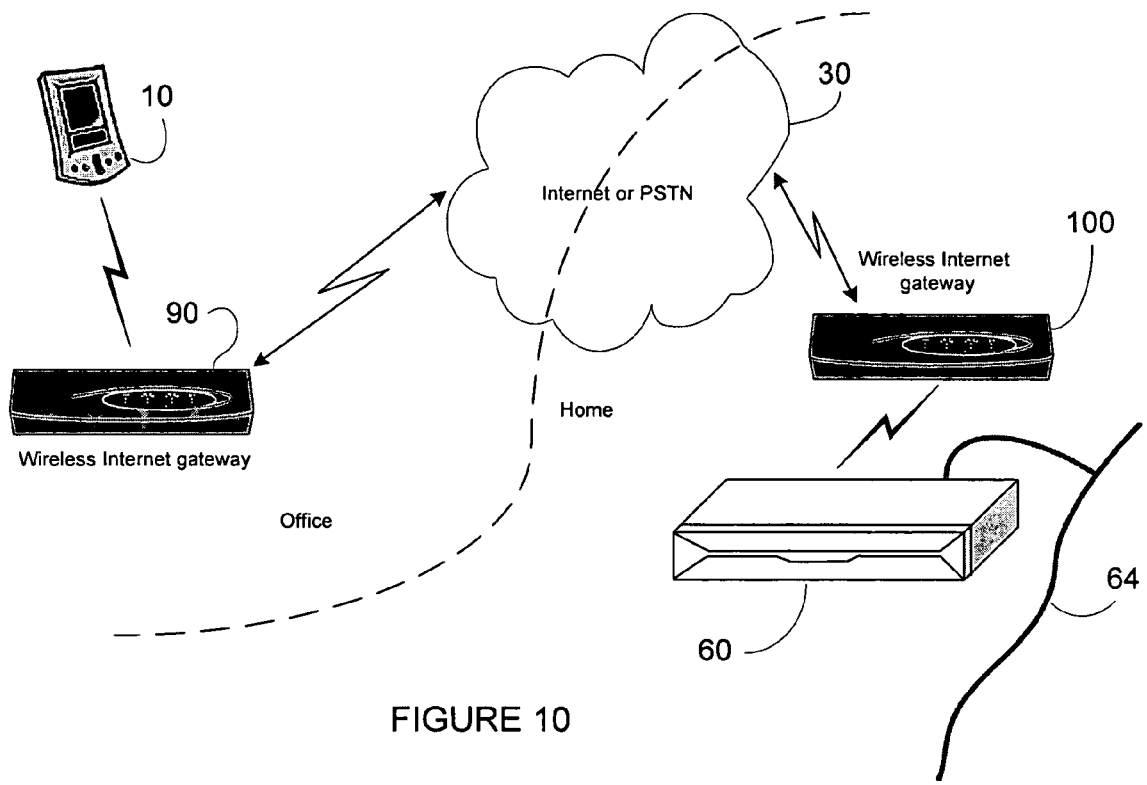
Figure 11:
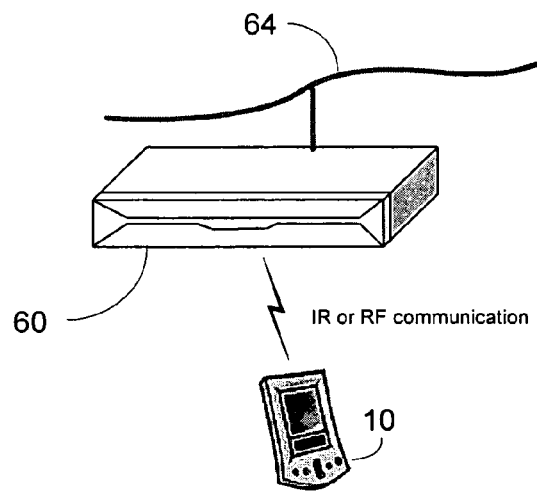

FIGS. 7 through 11 show various embodiments of networks employing this principle. In FIG. 7, the device 10 is in wireless communication with the computer 34, for example, as part of an IEEE 802.11 WiFi network. Alternatively, a Bluetooth personal area network may be used where the device 10 becomes active when brought into the house. FIG. 7 illustrates how such a network may include multiple appliances serving as content sources such as local PVRs local 60a, 60b, a remote PVR 68 (for example at a user's office or vacation home), the PC itself 34, or a DVD jukebox 70. The network of FIG. 7 also includes multiple rendering devices 16, some associated with PVRs 60 or 68, and others directly attached for example via a network video adapter 72. FIG. 8 shows how the device 10 may be docked at a remote computer 80 (e.g. in the consumer's office) which acquires the recording schedule request data and transfers it via the Internet 30 to the consumer's home computer 34 where it is processed as described previously (for clarity, the rest of the network associated with the home computer 34, assumed similar to that of FIG. 7 is not repeated in FIGS. 8 and 9). FIG. 9 shows a similar arrangement except that in this case the office system includes a wireless Internet gateway device 90 which is used by the device 10 to directly transfer the recording schedule request data to the Internet 30 and thereby to the computer 34. FIG. 10 shows an arrangement in which both ends are equipped with wireless Internet gateways and the device 10 transfers the recording schedule request data directly to a recording appliance 60 which itself serves as an interface into the rest of the home network. Still further, FIG. 11 shows a system in which device 10 communicates directly via a wireless link with a recording appliance 60. In this case, the device 10 transfers the recording schedule request data directly to the recording appliance 60 when it is brought into proximity to the recording appliance 60, using either infrared or RF wireless communication. Transfer in this case may be manually initiated by the consumer, triggered automatically (for example, by the device 10 sensing it has been brought into range of a Bluetooth personal area network of which the recording appliance 60 is also a member), may be automatically initiated at a user-selected fixed time each day, etc. Once again, recording appliance 60 may serve as an interface or gateway into the rest of the home network.

While specific embodiments of the invention have been described in detail, it will be appreciated by those skilled in the art that various modifications and alternatives to those details could be developed in light of the overall teachings of the disclosure. For example, it will be appreciated that while a PVR was utilized in the illustrative example set forth above, in fact any appliance capable of recording program material, including the computer itself, may be scheduled in this manner. In addition, it will be appreciated that the device can be setup such that an indication to a record a program can be accomplished by allowing a consumer to directly select a program from the guide without the need for providing a pop-up window or additional graphical user interface selection elements. Accordingly, the particular arrangement disclosed is meant to be illustrative only and not limiting as to the scope of the invention which is to be given the full breadth of the appended claims and any equivalents thereof. All of the references cited herein are hereby incorporated by reference in their entirety.

What is claimed is:

1. In a portable device having a display, a method for enabling a user to effect recording of a program, the method comprising:
   displaying in the display of the portable device a program guide including a listing for the program;
   receiving at the portable device input requesting that the program be recorded;
   causing the portable device to obtain from a calendar application data indicative of user schedule data; whereupon the portable device automatically selects an appliance to record the program as a function of the obtained user schedule data; and
   transmitting from the portable device a communication to cause the selected appliance to effect recording of the program.

2. The method as recited in claim 1, wherein the portable device automatically changes the selected appliance to another appliance in response to a change in the user schedule data and the portable device transmits a communication to cause the another appliance to effect recording of the program in lieu of the selected appliance.

3. The method as recited in claim 1, wherein the input comprises a selection of the program listing from within the displayed program guide.

4. The method as recited in claim 1, wherein the calendar application is resident on the portable device.

5. The method as recited in claim 1, wherein the user schedule data comprises data indicative of a geographic location.

6. The method as recited in claim 5, comprising accepting input via a graphical user interface to designate an appliance to be used to effect recording at the geographic location.

7. The method as recited in claim 1, wherein the user schedule data comprises a room designation.

8. The method as recited in claim 1, comprising, storing in the portable device data indicative of the recording request.

9. The method as recited in claim 8, comprising providing the data indicative of the recording request directly to the selected appliance when it is determined that the portable device is able to establish communication with the selected appliance.

10. The method as recited in claim 1, further comprising downloading the data indicative of the recording request to a personal computer capable of communicating with the selected appliance.

11. The method as recited in claim 1, wherein the portable device is a PDA.

12. For use in a portable device having a display, a non-transitory readable media having stored thereon executable, instructions for enabling a user to effect recording of a program, the instructions performing steps comprising:
   displaying in the display a program guide including a listing for the program;
   receiving input requesting that the program be recorded;
   obtaining from a calendar application data indicative of user schedule data;
   automatically selecting an appliance to record the program as a function of the obtained user schedule data; and
   causing the portable device to transmit a communication to cause the selected appliance to effect a recording of the program.

13. The non-transitory readable media as recited in claim 12, wherein the instructions perform steps for automatically changing the selected appliance to another appliance in response to a change in the user schedule data and for causing the portable device to transmit a communication to cause the another appliance to effect recording of the program in lieu of the selected appliance.

14. The non-transitory readable media as recited in claim 12, wherein the input comprises a selection of the program listing from within the displayed program guide.

15. The non-transitory readable media as recited in claim 14, wherein the calendar application is resident on the portable device.

16. The non-transitory readable media as recited in claim 12, wherein the user schedule data comprises data indicative of a geographic location.

17. The non-transitory readable media as recited in claim 16, wherein the instructions perform a step of accepting input via a graphical user interface to designate an appliance to be used to effect recording at the geographic, location.

18. The non-transitory readable media as recited in claim 12, wherein the user schedule data comprises a room designation.

19. The non-transitory readable media as recited in claim 12, wherein the instructions perform a step of storing in the portable device data indicative of the recording request.

20. The non-transitory readable media as recited in claim 19, wherein the instructions perform a step of providing the data indicative of the recording request directly to the selected appliance when it is determined that the portable device is able to establish communication with the selected appliance.

21. The non-transitory readable media as recited in claim 12, wherein the instructions perform a step of, downloading the data indicative of the recording request to a personal computer Capable of communicating with the selected appliance.

22. The non-transitory readable media as recited in claim 12, wherein the portable device is a PDA.

\* \* \* \* \*